United States Patent
McKinnon et al.

(10) Patent No.: US 11,689,538 B2
(45) Date of Patent: Jun. 27, 2023

(54) METHODS AND SYSTEMS FOR AUTHENTICATION FOR HIGH-RISK COMMUNICATIONS

(71) Applicant: Capital One Services, LLC, McLean, VA (US)

(72) Inventors: Nathaniel McKinnon, Henrico, VA (US); Jeremy Phillips, Brooklyn, NY (US)

(73) Assignee: Capital One Services, LLC, McLean, VA (US)

(*) Notice: Subject to any disclaimer, the term of this patent is extended or adjusted under 35 U.S.C. 154(b) by 269 days.

(21) Appl. No.: 17/083,161

(22) Filed: Oct. 28, 2020

(65) Prior Publication Data
US 2022/0131870 A1 Apr. 28, 2022

(51) Int. Cl.
*H04L 29/06* (2006.01)
*H04L 9/40* (2022.01)
*G06F 16/23* (2019.01)
*G06F 16/28* (2019.01)
*H04L 9/32* (2006.01)

(52) U.S. Cl.
CPC ........ *H04L 63/105* (2013.01); *G06F 16/2379* (2019.01); *G06F 16/285* (2019.01); *H04L 9/3226* (2013.01); *H04L 63/1433* (2013.01)

(58) Field of Classification Search
CPC . H04L 63/105; H04L 9/3226; H04L 63/1433; H04L 63/10; H04L 63/14; H04L 63/1408; H04L 63/1441; H04L 63/1466; G06F 16/2379; G06F 16/285; G06F 21/44; G06F 21/34; G06F 21/40
See application file for complete search history.

(56) References Cited

U.S. PATENT DOCUMENTS

| 9,300,664 | B2 | 3/2016 | Robison et al. |
| 9,813,236 | B2 | 11/2017 | Buer |
| 2010/0274721 | A1 | 10/2010 | Hammad |
| 2011/0184867 | A1 | 7/2011 | Varadarajan |

(Continued)

FOREIGN PATENT DOCUMENTS

WO 2014093390 A1 6/2014

OTHER PUBLICATIONS

International Search Report issued in International Application No. PCT/US2021/056632 dated Feb. 2, 2022 (13 pages).

*Primary Examiner* — Malcolm Cribbs
(74) *Attorney, Agent, or Firm* — Bookoff McAndrews, PLLC

(57) ABSTRACT

An authentication method includes assigning a risk status to a request received from a remote interaction system, transmitting a notification communication to a device associated with the request, monitoring interaction data from an interaction network, and identifying, from the monitored interaction data, authentication interaction information, the authentication interaction information including a coded sequence and a predetermined authentication identifier. The authentication method also includes comparing the coded sequence in the authentication interaction information to an expected coded sequence and transmitting a verification communication after determining the coded sequence in the authentication interaction information matches the expected coded sequence.

20 Claims, 4 Drawing Sheets

(56) References Cited

U.S. PATENT DOCUMENTS

| | | | |
|---|---|---|---|
| 2013/0067546 A1* | 3/2013 | Thavasi | G06F 21/31 |
| | | | 726/7 |
| 2014/0101048 A1* | 4/2014 | Gardiner | G06Q 20/401 |
| | | | 705/44 |
| 2017/0093920 A1* | 3/2017 | Ducatel | G06F 21/316 |
| 2018/0075452 A1 | 3/2018 | Weller et al. | |
| 2019/0340599 A1 | 11/2019 | Lovett | |
| 2020/0195671 A1* | 6/2020 | Engan | H04L 63/1425 |
| 2021/0243198 A1* | 8/2021 | Naumann zu Koenigsbrueck | |
| | | | H04L 63/10 |

* cited by examiner

METHODS AND SYSTEMS FOR AUTHENTICATION FOR HIGH-RISK COMMUNICATIONS

TECHNICAL FIELD

Various embodiments of the present disclosure relate generally to authentication, and, more particularly, to the use of cryptographically-enabled devices for authenticating one or more users and/or user requests.

BACKGROUND

Large numbers of electronic communications are initiated on a daily basis, including secure communications associated with sales of goods or services, peer-to-peer interactions such as interactions related to payments or gifts, cash advances, and others. Various strategies are employed to ensure the security of these interactions, including strategies for authenticating an identity of one or more parties associated with the communication. For example, entities, such as financial institutions or other interested parties, receive, evaluate, and approve or deny requests contained in these communications based on the ability to authenticate the identity of an end user, a merchant, etc. In particular, before approving or denying requests associated with these communications, it is often desirable to verify the identity of a party that initiated the request. This can be especially true for communications involving a request to transfer funds to another party. However, due to the large volume of these communications, it can be difficult or impractical for institutions to manually identify and review every communication, or even manually review a significant number of these communications.

In light of these challenges, efforts to improve the security of communications by automated processes have become increasingly important. For example, some systems identify users by using a plurality of layers or "factors" of authentication, in addition to, or in place of, a user name and password combination. This is accomplished by transmitting a one-time code or one-time password to the user (e.g., via a cellular network message). While such authentication methods may be useful in some circumstances, the security of such methods may be inadequate, at least for high-risk applications. For example, vulnerabilities in systems for transmitting and/or receiving a one-time code or password can reduce the reliability of a so-called second factor of authentication.

The present disclosure is directed to overcoming one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for authenticating or approving a user request, such as a request that is determined to be associated with a risk status (e.g., a relatively high-risk interaction, an interaction associated with one or more high-risk or untrusted participants, etc.). The methods and systems may facilitate authentication of a user's identity by receiving a cryptogram associated with a device of the user from one or more remote authentication systems.

In at least some communication systems, it may be challenging to authenticate a communication via cellular network communications. For example, these communications may be vulnerable to hijacking attacks, which are likely to increase in sophistication and volume in the future. In order to avoid these and other potential vulnerabilities, in at least some aspects of the present disclosure, cryptographically-enabled devices may be employed. These secure devices may be used with, for example, one or more predetermined identifiers, trusted locations, and/or trusted systems, to generate encoded information, which is subsequently evaluated with the use of, for example, a cryptographic key. These and other aspects of the disclosure may, for example, reduce or eliminate reliance upon less secure communication systems.

In one aspect, an authentication method may include assigning a risk status to a request received from a remote interaction system, transmitting a notification communication to a device associated with the request, monitoring interaction data from an interaction network, and identifying, from the monitored interaction data, authentication interaction information, the authentication interaction information including a coded sequence and a predetermined authentication identifier. The authentication method may also include comparing the coded sequence in the authentication interaction information to an expected coded sequence and transmitting a verification communication after determining the coded sequence in the authentication interaction information matches the expected coded sequence.

In another aspect, an authentication system may include a communication device, a memory storing instructions, and one or more processors configured to execute the instructions to perform operations. The operations may include identifying a user request requiring authorization, transmitting a notification to a user device of the user associated with the request, the notification including a request for authentication with a cryptographic-enabled device associated with the user, and receiving a coded sequence which was generated at least in part by the cryptographic-enabled device. The operations may also include comparing the received coded sequence and an expected coded sequence and updating a data security database storing user identifiers and authentication level information associated with the user identifiers based on the comparison of the received coded sequence and the expected coded sequence.

In yet another aspect, an authentication method may include assigning a risk status to a request received from a remote interaction system, by evaluating the request or by receiving a risk assessment from one or more external services, transmitting a notification element to a device associated with the request, the notification element being indicative of a decline of the request or a hold on the request, and identifying authentication interaction information, the authentication interaction information including a cryptographic key and a predetermined authentication identifier. The authentication method may also include comparing the cryptographic key in the authentication interaction information to an expected cryptographic key and transmitting a verification when the cryptographic key in the authentication interaction information matches the expected cryptographic key.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
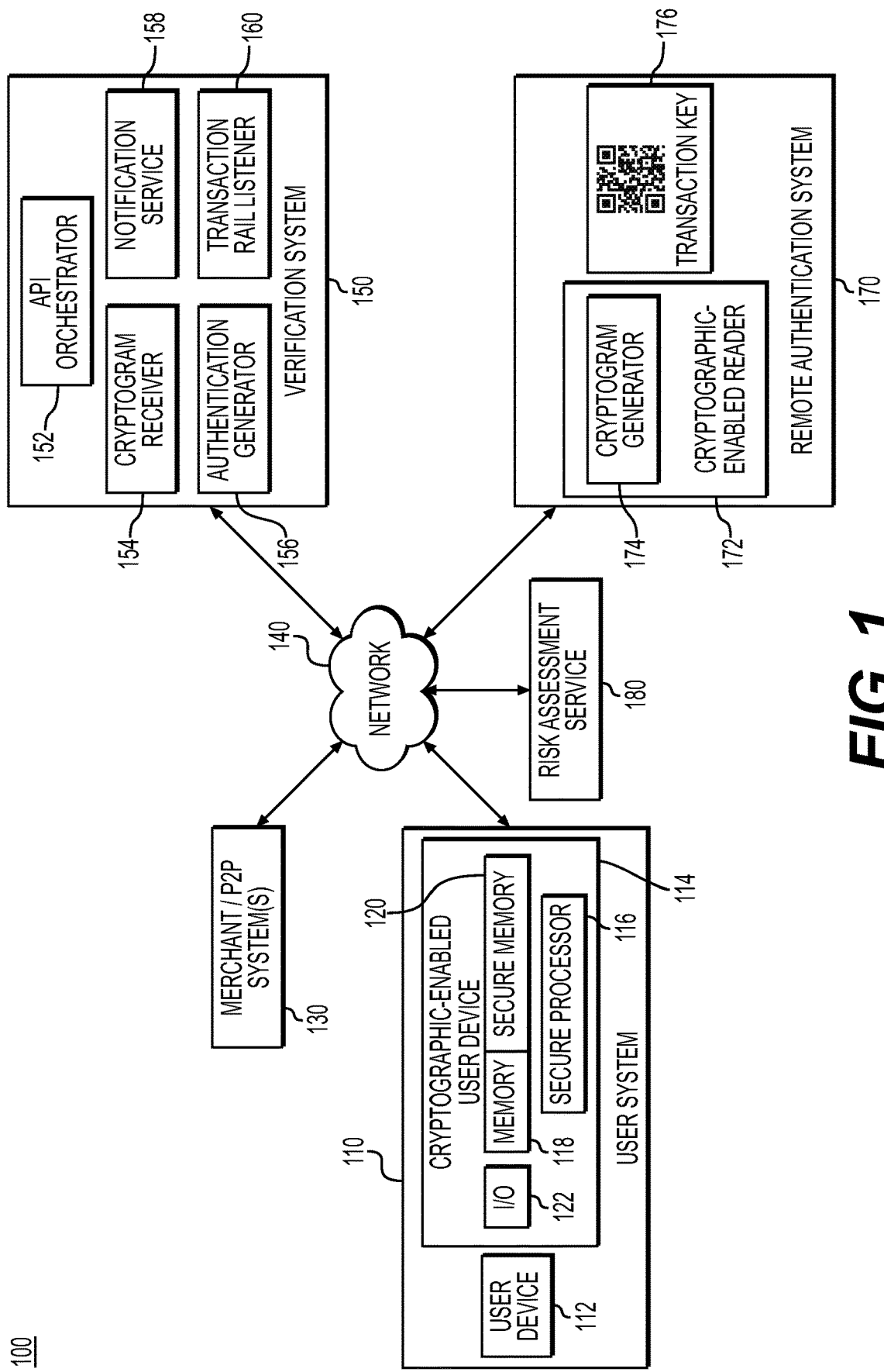
FIG. 1 depicts an exemplary system environment, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As discussed in more detail below, in various embodiments, a request may be initiated by a remote system, such as a device associated with a user or end user. When the request is associated with risk (e.g., a particular type of request, a request having a value that is greater than a predetermined value, a request associated with a new or suspicious account, etc.), a notification may be transmitted to a device associated with the end user, such as the remote system. As an example, the notification may direct the end user to perform an authentication process by interacting with a cryptographically-enabled authentication system to verify that the end user is in possession of a particular cryptographic-enabled device issued to this end user. When the end user is in possession of this cryptographic-enabled user device, the request may be approved, and, if desired, a security database may be updated to increase an authentication level of the end user.

Advantageously, by transmitting a notification to a device associated with the request, it may be possible to employ a device that may be in the possession of an end user, such as a card including cryptographic-enabled components. The use of a cryptographic-enabled user device may facilitate reliable authentication while minimizing inconvenience associated with authenticating an end user. Such methods may employ existing communication infrastructure (e.g., interaction rails, such as transaction rails for payment processing). Additionally, by increasing an authentication level of an end user, the authentication method may efficiently facilitate future requests of the end user.

FIG. 1 is a diagram depicting an exemplary system environment 100 according to one or more embodiments of the present disclosure. System environment 100 may include one or more user systems 110, one or more merchant and/or peer-to-peer (P2P) systems 130, one or more verification systems 150, and one or more remote interaction systems or remote authentication systems 170. If desired, system environment 100 may also include one or more risk assessment systems or services 180. User system 110 may include one or more individual devices or computer systems that are associated with one or more particular users (e.g., end users associated with respective user identifiers and/or user names). In the exemplary system environment 100 illustrated in FIG. 1, an end user may be associated with a user device 112 and with a cryptographic-enabled ("CE") user device 114. User device 112 may be a computing device, such as a portable or stationary computing device. In some aspects, user device 112 may include a plurality of different computing systems associated with a single end user.

CE user device 114 may include a secure processor 116, one or more memory modules, such as memory 118 and secure memory 120, and an input/output ("I/O") system 122. Secure processor 116 may be, for example, a secure cryptoprocessor configured to access information stored in memory 118 and secure memory 120. Secure memory 120 may be configured to store a cryptogram key (e.g., a private key). The I/O 122 of CE device 114 may be configured to receive electrical power supplied to enable operation of secure processor 116, memory 118, and secure memory 120. I/O 122 may also facilitate communication between CE user device 114 and one or more remote authentication systems 170, based on signals generated by secure processor 116. CE user device 114 may have any suitable form factor, including a size and shape substantially the same as that of a credit or debit card.

User device 112 may be a portable computing device having one or more processors for initiating one or more requests or interactions as described herein, including one or more requests or interactions associated with a risk status. User device 112 may include a display, one or more input devices (which may be formed by, or may include, the display), communication devices, etc., that facilitate communication with one or more merchants, peer-to-peer interactions, or interactions involving funds. Exemplary communications may be initiated or requested via network 140.

Merchant/P2P systems 130 may include one or more computer systems associated with or belonging to one or more merchants or peers. In the case of merchants, systems 130 may include systems for hosting one or more electronic storefronts for interactions involving physical or electronic goods and services. Systems 130 may be associated with a single merchant (e.g., a website hosted by a particular merchant) or associated with a plurality of different merchants (e.g., via a storefront hosting service, aggregator, shared e-commerce platform, etc.). Additionally or alternatively, system 130 may correspond to one or more peer-to-peer systems, which may be third party systems configured to facilitate the transfer of funds between one or more end users, including banking applications, third-party applications, etc.

Verification system 150 may include one or more systems that are configured to monitor, evaluate, approve, suspend, and deny requests initiated by user devices 112 associated with a respective plurality of end users. Verification system 150 may include one or more computer systems, including servers and/or distributed computing systems which are configured to provide a plurality of respective functions and perform one or more of the functions of components 152-160. Verification system 150 may include an application programming interface ("API") orchestrator 152, cryptogram receiver 154, authentication generator 156, notification service 158, and a transaction rail listener 160.

API orchestrator 152 may include hardware and software components configured to facilitate communication for various components or services, as described below. In some aspects, communication with these components or services may require the use of a plurality of APIs. Thus, API orchestrator 152 may be programmed to interface, via these APIs, with a plurality of components or services, and thereby coordinate communication between these services to perform end user authentication, as described below.

Cryptogram receiver 154 may be configured to generate one or more expected cryptograms and compare an expected cryptogram to one or more received cryptograms (e.g., a cryptogram generated by remote authentication system 170). Authentication generator 156 may be configured to generate and transmit a verification communication, such as an approval for a request, when cryptogram receiver 154 determines that a received cryptogram matches an expected cryptogram. Exemplary cryptograms corresponding to the received cryptogram and the expected cryptogram may include one or more coded sequences, such as an alphanumeric sequence, a hexadecimal sequence, or another sequence. In some aspects, authentication generator 156 may be further configured to update an authentication level such as a level of trust stored in a user classification database, as described below. A notification service 158 may be configured to generate and transmit one or more notifications to user devices 112. Transaction rail listener 160 may be configured to monitor one or more types of interactions processed (e.g., interactions involving debit rails) to monitor authentication interaction information and identify cryptograms including one or more coded sequences and authentication identifiers, as described below. In some aspects, some or all of cryptogram receiver 154, authentication generator 156, notification service 158, and rail listener 160, may be in communication with each other via API orchestrator 152.

System environment 100 may also include one or more remote authentication systems 170. Remote authentication systems 170 may be implemented as one or more of an automated teller machine ("ATM"), a point of sale device (e.g., a terminal), or any other CE-enabled systems that are configured to securely interact with CE user device 114. Remote authentication system 170 may include one or more of the systems 130. Additionally or alternatively, system 170 may be related to system 130 (e.g., systems 130 and 170 are operated by a single entity) and may be in communication with system 130. For example, system 130 may provide or host a virtual or internet-based platform for interactions (e.g., a storefront, peer-to-peer platform, finance or banking website, or others), and remote authentication system 170 may include one or more systems for in-person interactions (e.g., systems present at a retail location, ATM, etc.). Remote authentication system 170 may include a CE reader 172 and a cryptogram generator 174. In exemplary configurations, CE reader 172 may be configured to provide power to, and communicate with CE devices such as CE user device 114. CE reader 172 may be a device that is separate and distinct from, e.g., not physically or electrically connected to, user device 112. Cryptogram generator 174 may be configured to generate a cryptogram including a coded sequence by communicating with CE device 114, as described below. An optional transaction key 176 may encode a predetermined authentication identifier. This predetermined authentication identifier may be known by verification system 150 and used to identify one or more communications generated by remote authentication system 170 when CE user device 114 is present. If desired, cryptogram generator 174 may also receive information from system 130 to facilitate the generation of a cryptogram. For example, transaction key 176 may be provided by system 130 to cryptogram generator 174.

Figure 2:
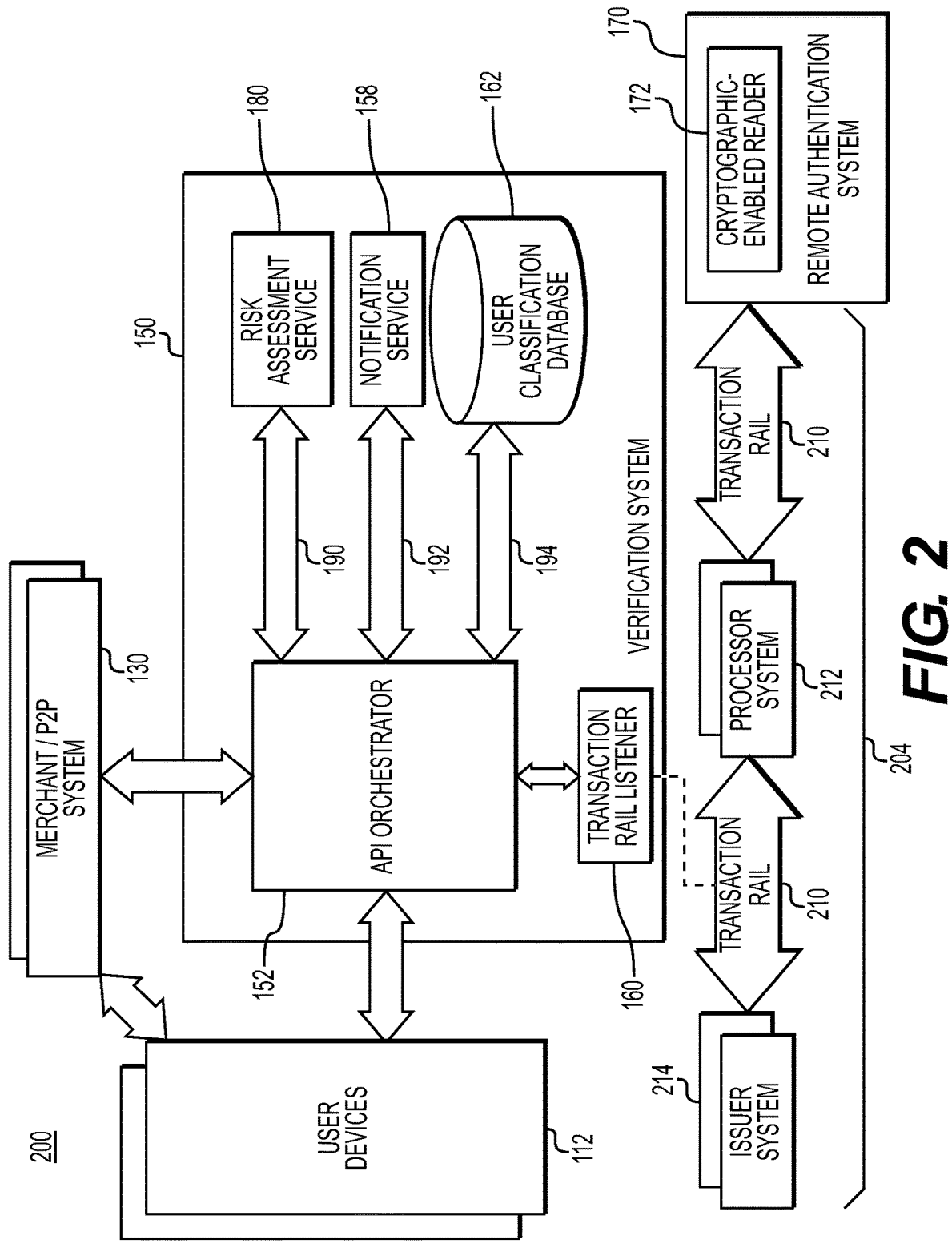
FIG. 2 depicts an exemplary authentication architecture of the exemplary system environment, according to one or more embodiments.

System environment 100 may, if desired, include one or more risk assessment services 180. Risk assessment services 180 may be in communication with verification systems 150, as shown in FIG. 1, or provided as part of verification system 150, as shown in FIG. 2. Risk assessment services 180 may be configured to evaluate requests for interactions or transfers on behalf of merchants, peer-to-peer services, financial institutions, or other entities. In some aspects, a risk assessment service 180 may be configured to assign a risk status to one or more requests for verification system 150, or to communicate a risk status to verification system 150, as described below.

Network 140 may be any suitable network or combination of networks and may support any appropriate protocol suitable for communication of data to and from user device 112 or other devices associated with one or more end users, merchant/P2P systems 130, verification system 150, remote authentication system 170, risk assessment service 180, as well as between any other components in system environment 100. Network 140 may include a public network, a private network (e.g., a network within an organization), or a combination of public and/or private networks. Network 140 may be configured to provide communication between various components depicted in FIG. 1 and any other systems described herein. For example, the network 140 may be implemented as the Internet, a wireless network, a wired network (e.g., Ethernet), a local area network (LAN), a Wide Area Network (WANs), Bluetooth, Near Field Communication (NFC), combinations thereof, or any other type of network or combination of networks that provides communications between one or more components of system environment 100. In some embodiments, network 140 may be implemented using cell and/or pager networks, satellite, licensed radio, or a combination of licensed and unlicensed radio.

FIG. 2 illustrates an authentication architecture 200 according to one or more aspects of the present disclosure. Authentication architecture 200 may include external systems, such as user devices 112, one or more merchant/P2P system(s) 130, and systems associated with transaction rails 210, which may be part of a transmission system 204. Authentication architecture 200 may also include one or more internal systems, such as verification system(s) 150. Verification system 150 may be implemented as a single system, or as a plurality of systems, such as a combination of hardware and software (e.g., servers, API interfaces, microservices, etc.). For clarity, cryptogram receiver 154 and authentication generator 156 of verification system 150 are not shown in FIG. 2.

Authentication architecture 200 may be useful for authentication of requests generated by user interactions with user devices 112. For example, an end user interacting with device 112 may, by communicating with merchant/P2P systems 130, generate a request to purchase goods and/or services, to transfer funds, or other requests described herein (e.g., an application for credit, a cash advance, a change of address, a wire transfer, an automated clearing house transfer, etc.). User device 112 may initiate or generate the request, which is transmitted to one or more merchant/P2P systems 130 via network 140 (FIG. 1). Merchant/P2P system 130 may be configured to transmit this request (or information corresponding to the request) to verification system 150. This may include, for example, a request to approve an interaction, a purchase, or a transfer initiated by user device 112. Additionally or alternatively, merchant/P2P system 130 may generate a request to evaluate risk associated with an interaction, such as a transaction, purchase, transfer, etc., and transmit this request to verification system 150. If desired, user devices 112 may transmit a request to verification system 150 in place of merchant/P2P system 130.

Verification system 150 may be configured to perform processing to evaluate risk associated with the request, for example, by assigning a risk status to the request. Verification system 150 may employ one or more API orchestration layers, such as API orchestrator 152, to perform verification operations described herein. API orchestrator 152 may be implemented by suitable hardware and software that is configured (e.g., programmed) to interact with a plurality of different services and/or databases via a plurality of APIs. For example, API orchestrator 152 may initiate API calls, via a risk assessment API 190, for risk assessment service 180 to evaluate risk and/or assign a risk status, as described below. Risk assessment service 180 may be one or more components of verification system 150 that are configured to evaluate a level of risk associated with one or more requests. While risk assessment service 180 is shown as being a component of verification system 150 in FIG. 2, risk assessment service 180 may be implemented as one or more systems external to verification system 150 (see FIG. 1).

When a request is determined to be associated with risk, risk assessment service 180 may assign a binary flag. This binary flag may indicate that the request is associated with risk. Examples of requests that may be associated with risk may include user-to-user transfers, a request to change personal information associated with an end user (e.g., address, phone number, etc.), a purchase of a cashier's check, or other interactions or transactions, including interactions or transactions that would traditionally be performed in person. Additional examples of requests that may be associated with risk include requests having a value greater than a predetermined threshold, requests for purchasing one or more items that have the potential for fraudulent use (e.g., gift cards or other stored value cards), and/or loan or credit applications. Additionally or alternatively, risk assessment service 180 may be configured to assign different levels of risk based on a type of request and/or a value associated with the request. For example, a low or moderate level of risk (a first level and a second level, respectively) may be associated with relatively low value and/or low or moderate risk requests for which a traditional authentication process may be suitable. A high level of risk (a third level higher than the first and second levels) may be associated with relatively high value and/or high risk requests (e.g., requests having a value larger than first and second thresholds or a risk level greater than first and second risk level thresholds). Verification system 150 may process such high-risk requests in the manner described below with respect to method 300 (FIG. 3), described below.

When a request is associated with a level of risk, API orchestrator 152 may be configured to initiate an API call, via a notification API 192, for notification service 158, as described below. Notification service 158 may be configured to generate one or more notifications that are received by user devices 112 and, if desired, merchant/P2P systems 130. While notification service 158 is illustrated as a component or feature of verification system 150, and may be implemented as part of a platform formed by system 150, notification service 158 may instead be implemented by one or more external and/or third-party systems (see FIG. 1).

Verification system 150 may further include a user classification database 162 storing data, such as a plurality of user identities (e.g., anonymized user identifiers), and a plurality of respective levels of trust that are associated with respective user identifiers. API orchestrator 152 may be configured to receive data from user classification database 162 via a user service API 194 when evaluating one or more requests. In at least some configurations, verification system 150 may be further configured to update user classification database 162. For example, API orchestrator 152 of verification system 150 may be configured to update database 162 by increasing a level of trust associated with one or more end users that are authenticated via remote authentication system 170, as described below. In some configurations of database 162, each end user may be associated with a single level of trust, which may be indicative of whether a respective end user is trusted or untrusted. This level of trust may be updated (e.g., upgraded or downgraded) by verification system 150. However, in some configurations, each end user may be associated with two or more levels of trust, for example, different levels of trust for different categories of actions. For example, a user may have a first level of trust associated with credit card interactions (e.g., with a particular card), a second level of trust associated with peer-to-peer interactions, and a third level of trust associated with high dollar-value interactions. Accordingly, levels of trust may be stored as binary flags (e.g., flags indicative of a trusted end user or an untrusted end user), or by different values (e.g., a scale of 1, 2, 3, 4, etc.). When values are stored in database 162, a lower value may be associated with new end users (e.g., end users with little or no interaction history), or end users that may be associated with a lower level of security, such as users that have weak, common, or compromised passwords, user accounts that have been previously compromised or associated with fraudulent activity (e.g., international log-in attempts), user accounts that have an age less than a predetermined age, or others.

As shown in FIG. 2, transaction rail listener 160 may receive information, such as interaction communications, from one or more components of transmission system 204. API orchestrator 152 may be configured to initiate API calls to transaction rail listener 160 to monitor communications of system 204. Rail listener 160 may include one or more automated processes or services configured to monitor communications that are indicative of interactions that are processed via transmission system 204. These interactions may include, for example, card-present transactions at merchants, debit transactions at banks or ATMs, etc. Rail listener 160 may be further configured to identify a predetermined unique identifier associated with an authentication performed via a remote authentication system 170. While rail listener 160 is illustrated as being in communication with an exemplary rail 210 for communications between processor system 212 and issuer system 214, as understood, transaction rail listener 160 may monitor communications at any other suitable point within transmission system 204, such as a rail 210 that facilitates communications between remote authentication system 170 and processor system 212. Alternatively, rail listener 160 may be incorporated into one or more issuer systems 214 or processor systems 212.

Remote authentication system 170 may communicate with one or more external systems, such as one or more components of transmission system 204, after, or while, CE reader 172 interacts with CE user device 114. System 204 may be configured for interaction processing for a plurality of platforms (e.g., vendors, financial institutions, ATM locations, etc.) that are equipped with one or more authentication systems 170. Interaction processing may be facilitated by one or more transaction rails 210 configured for real-time or near real-time communication between remote authentication system 170, one or more processor systems 212, and one or more issuer systems 214. In some configurations, asynchronous and/or periodic communication may be performed via system 204, instead of or in addition to real-time communication.

In some configurations of transmission system 204, a communication or interaction, such as a transaction, a request for verification, and/or a request for an authorization, may be initiated when a CE customer device 114 interacts with one or more components of remote authentication system 170, such as CE reader 172. If desired, a notification may be transmitted from remote authentication system 170 after CE reader 172 performs a preliminary evaluation of information presented by CE device 114 and, if desired, information encoded in transaction key 176, which may be received via system 170 and/or 130. This notification may be facilitated by network 140, for example, so as to facilitate communication between remote authentication system 170 and one or more processor systems 212 via a transaction rail 210.

Processor systems 212 may include, for example, one or more computer systems provided as part of an infrastructure for receiving interaction communications from a plurality of remote authentication systems 170. Processor systems 212 may be configured to generate a request, for an issuer system 214, to approve the interaction (e.g., merchant interactions and/or debit interactions). Issuer system 214 may be associated with the issuer of CE device 114, a financial institution, or another entity that has a relationship with the end user. Communications generated by processor systems 212 and received by issuer systems 214 may include at least some, and in some configurations an entirety, of the information provided to processor system 212 from remote authentication system 170. At least some of the communications transmitted via transmission system 204 may be coded communications that include authentication interaction information indicative of a cryptogram, which may include a coded sequence, generated by cryptogram generator 174, a predetermined authentication identifier such as transaction key 176, a value, an identity of the remote authentication system 170, a location of system 170, an interaction identifier, and any other suitable information, as described below. Authentication interaction information may be generated by an interaction performed for the purpose of authenticating an end user associated with CE device 114.

Figure 3:
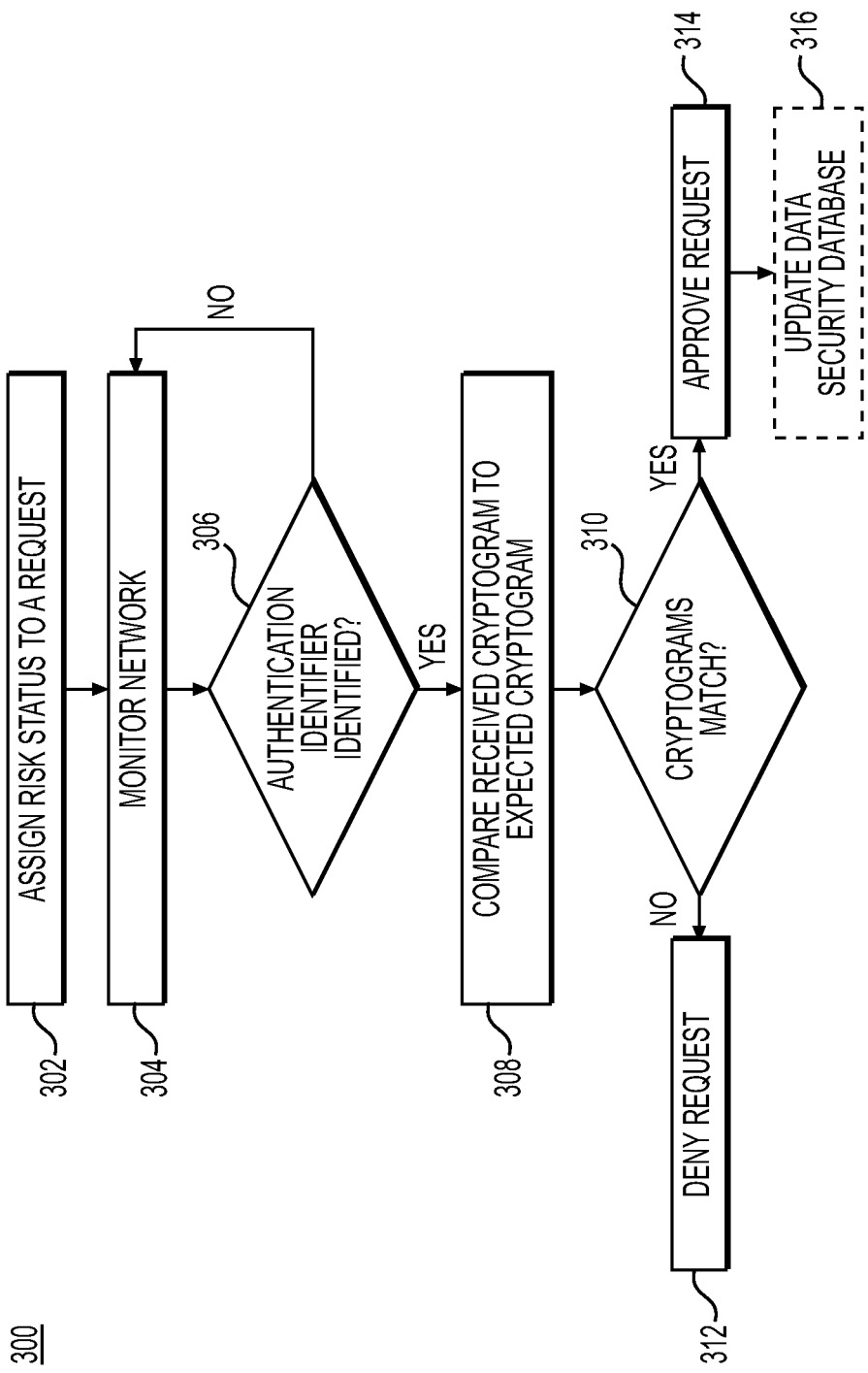
FIG. 3 depicts a flowchart of an exemplary authentication method, according to one or more embodiments.

FIG. 3 is a flowchart illustrating an exemplary authentication method 300 that may be useful for evaluating one or more requests and/or one or more end users that may be untrusted or that may be associated with a low level of trust. The method may be performed by one or more components of verification system 150, for example.

A step 302 of method 300 may include assigning a risk status to a request. Step 302 may involve evaluating, via one or more automated processes, whether a particular request is associated with risk. This evaluation may be determined based on one or more attributes of the interaction, attributes of the parties, or both. To perform this evaluation, API orchestrator 152 may initiate one or more API calls, via risk assessment API 190, for one or more risk assessment services 180. As noted above, risk assessment services 180 may be components of verification system 150, or, in at least some embodiments, third-party services. Risk assessment service 180 may be configured to determine a risk status based on one or more characteristics of the request, one or more characteristics of the requestor, and/or one or more characteristics of the intended recipient or merchant. With respect to the requestor, a risk status may be assigned when the requestor is not yet trusted (e.g., a new end user, customer, sender, etc.). In one aspect, an identity of the requestor may be associated with an amount of trust, e.g., by storing a plurality of user identities (e.g., anonymized user identifiers) with a plurality of respective amount or levels of trust in user classification database 162.

If desired, step 302 may include transmitting a notification communication to one or more user devices 112, via notification service 158. This notification may be transmitted in response to the assignment of a risk status, for example. When a user device 112 receives this notification, a display of the user device may provide information to the end user. This information may, for example, request a supplemental authentication of the end user by interacting with a trusted device, such as a remote authentication system 170. In particular, the displayed information may request that the end user interact with remote authentication system 170 by using a particular CE user device 114, that is associated with the user, with a remote authentication system 170. The information may, if desired, be indicative of the assigned risk status and may explain that a request initiated at user device 112 was placed on hold, or declined, pending authentication of the end user. In some aspects, the information presented to the end user may be based on a level of trust associated with the end user and stored in user classification database 162. In some aspects, the information may include an identity and/or location of one or more remote authentication systems 170, to assist the end user in locating and identifying remote authentication system 170. For example, notification service 158 may transmit a list of geographic locations (e.g., merchant locations, ATM locations, bank locations, etc.) that are in possession of one or more remote authentication systems 170 to allow a display of user device 112 to present this list to the end user.

A step 304 may include monitoring a network, and may be performed by one or more systems of verification system 150. For example, an interaction network including one or more transaction rails 210, such as transmission system 204, may be monitored via transaction rail listener 160. The network may be monitored for the presence of a request or other interaction data. This interaction data may include any of the above-described data associated with system 204, and may be indicative of one or more transactions. For example, monitored or obtained interaction data may include ATM interactions, banking interactions, retail interactions (e.g., via a point-of-sale system), merchant interactions, or any other appropriate communications.

The monitored interaction data may be evaluated for the presence of information (authentication interaction information) associated with an authentication of an end user. This authentication interaction information may be generated when the end user associated with user device 112 interacts with remote system 170 (e.g., in response to a notification presented on user device 112). Authentication interaction information may include one or more of an identity of a merchant associated with remote authentication system 170, a unique identifier associated with remote authentication system 170, a value associated with the interaction, an interaction identification number or code, a cryptogram, a predetermined authentication identifier, or a PIN submitted by the end user. In some aspects, this PIN may be a predetermined PIN associated with CE user device 114, and may be set by the end user in advance. Alternatively, this PIN may be transmitted by verification system 150 to user device 112 in response to the assignment of a risk status to a request. For example, a PIN or other unique code may be transmitted via one or more cellular networks to user device 112.

Some or all of the above-described authentication interaction information may be monitored via rail listener 160 (e.g., via one or more automated services) to identify one or more interactions that are performed by the end user associated with user device 112 and/or CE user device 114, in order to authenticate an identity of the end user. For example, verification system 150 may be configured to determine, via rail listener 160, that an interaction includes a cryptogram and a predetermined authentication identifier (e.g., an identifier encoded by transaction key 176). When a PIN is included in the authentication interaction information, the PIN may be input to remote system 170 and may be compared to the PIN initially transmitted by verification system 150 to user device 112.

Method 300 may include, in a step 306, determining when an authentication identifier is identified. An authentication identifier may be identified, for example, when a predetermined authentication identifier (e.g., a predetermined value, a predetermined alphanumeric code, etc., which may correspond to transaction key 176) is determined to be present in a communication of system 204. In some aspects, transaction rail listener 160 may repeatedly (continuously or intermittently) monitor networks associated with transmission system 204 for an authentication identifier. Until an authentication identifier is identified, the determination in step 306 may be negative, and step 304 may be repeated.

Once an authentication identifier is identified by rail listener 160, the determination in step 306 may be affirmative and step 308 may be performed. In step 308, a received cryptogram may be extracted from the communication containing the authentication identifier. This received cryptogram may be provided to cryptogram receiver 154. Additional information (e.g., of the above-described authentication interaction information) may be extracted from transmission system 204, include at least some data that originated from CE user device 114, including one or more of a unique identifier with CE user device 114, a user identifier (e.g., a name), an expiration date of CE user device 114, a cryptogram key, or others. In some aspects, the extracted interaction information may include all of the data employed to generate the cryptogram, with the exception of the cryptogram key.

In at least some aspects, it may be beneficial to transmit, via user device 112, additional information when the end user is present at remote authentication system 170. For example, user device 112 may be configured to generate biometric information based on an end user's interaction with a fingerprint reader, a facial recognition device, and/or an iris recognition device. This information may be transmitted from user device 112 to verification system 150 at a timing when CE device 114 interacts with system 170 and/or when the end user is present at system 170, in order to verify that the end user that initiated the request is in possession of CE device 114. Additionally or alternatively, geographic location information may be transmitted by user device 112 (e.g., information generated based on cellular network information, GPS information, WiFi information, etc.). This geographic location information may be compared to a known geographic location of remote authentication system 170.

A copy of the cryptogram key associated with CE user device 114 may be stored in a secure memory of verification system 150, or otherwise provided to cryptogram receiver 154 in a secure manner (e.g., without the use of a public network or unencrypted communication). Thus, in step 308, cryptogram receiver 154 of verification system 150 may be configured to generate the expected cryptogram based on this stored cryptogram key, in combination with the received authentication interaction information. When the copy of the cryptogram key stored by verification system 150 matches the cryptogram key corresponding to CE user device 112, the expected cryptogram will match the received cryptogram. However, if the received cryptogram is based on a cryptogram key that is different than the copy of the cryptogram key stored by verification system 150, the expected and received cryptograms will not match.

In step 310, the received cryptogram and the expected cryptogram may be compared to each other. In particular, the coded sequences of each cryptogram may be compared. When these two cryptograms match, verification system 150 may determine that the CE user device 114 that interacted with CE reader 172 is authentic and was issued to the end user associated with the request. Method 300 may then proceed to step 314. In at least some embodiments, step 310 may also include comparing any additional information associated with an end user's interaction with remote system 170 to expected information. For example, when a geographic location is received from user device 112, this geographic location may be compared to a known geographic location of remote system 170 to confirm that the end user was actually present at an expected geographic location. Additionally, step 310 may include assessing one or more items of biometric information received from user device 112. Finally, step 310 may include comparing the above-described PIN to an expected PIN. The determination in step 310 may depend on whether this received information matches each corresponding item of expected information.

When the two cryptograms compared in step 310 do not match, and/or if any expected information, such as biometric information, location information, and/or a PIN, does not match expected information, a step 312 may be performed. Step 312 may include, for example, denying the request by authentication generator 156. Denying the request may include determining that fraudulent activity may be associated with the request. If desired, step 312 may include storing a flag that indicates that the request is potentially fraudulent. Additionally or alternatively, step 312 may include transmitting a notification to user device 114 that informs an end user that the request was denied and/or requesting that the user re-attempt authorization by interacting with remote authentication system 170 (e.g., with a different CE user device 114 associated with the user).

In step 314, following a determination that the authorization request cryptogram and the authorization cryptogram match and, if desired, if biometric or geographic location information does confirm an end user's presence in the geographic location of system 170 (or within a predetermined distance of system 170), the request may be approved by authentication generator 156, e.g., by generating a verification communication. This may include, for example, approving a request which was previously placed on hold. Additionally or alternatively, approving the request may include re-submitting and approving previously-declined request, or submitting and approving a new request that matches the original request. In some configurations, step 314 may include transmitting a notification to user device 112 that informs an end user that the end user is authenticated and instructing the end user to re-submit the request.

An optional step 316 may be performed when the received and expected cryptograms match. Step 316 may be performed following step 314, at least partially concurrently with step 314, or prior to step 314. In step 316, a data security database may be updated based on this determination. For example, a level of trust may be increased or upgraded for the end user associated with the request. This level of trust may allow verification system 150 to authorize subsequent requests initiated by the end user, including requests that are assigned a risk status. This may beneficially avoid a situation where an end user receives a plurality of requests to interact with a remote authentication system 170 within a particular period of time. In some aspects, the increased or upgraded level of trust may be associated with a predetermined expiration date (e.g., 1 week, 1 month, 3 months, 6 months, 1 year, 2 years, etc.), after which verification system 150 may again provide a notification requesting an end user to perform the above-described authentication with CE user device 114 and remote authentication system 170.

In general, while particular processes have been outlined herein, it is contemplated that such processes are exemplary. A person skilled in the art will understand that variations on such processes, including repeating, re-ordering, adding, or deleting steps are well within the purview of one of ordinary skill in the art, and are contemplated by this disclosure as well.

In the exemplary configuration described above and illustrated in the Figures, an API orchestration layer, API orchestrator 152, may be employed to facilitate user authentication. However, in at least some configurations, API orchestrator 152 may be omitted. For example, verification system 150 may be implemented via one or more issuer systems, such as systems 214 (FIG. 2). These issuer systems 214 may receive requests from user device 112 and/or merchant/P2P system 130, and may perform one or more of the above-described functions, such as risk assessment, notifications, user classification, transaction rail listening, cryptogram receipt and comparison, and authentication generation.

In general, any process discussed in this disclosure that is understood to be computer-implementable, such as the processes illustrated in FIG. 3, may be performed by one or more processors of a computer system, such as the verification system 150, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

Systems such as the user device 112, merchant/P2P systems 130, verification system 150, and risk assessment service 180, may include one or more computing devices. If the one or more processors of the user device 112, merchant/P2P systems 130, verification system 150, and/or risk assessment service 180 are implemented as a plurality of processors, the plurality of processors may be included in a single computing device or distributed among a plurality of computing devices. If a user device 112, merchant/P2P systems 130, verification system 150, and/or risk assessment service 180 comprises a plurality of computing devices, the memory of the user device 112, merchant/P2P systems 130, verification system 150, and/or risk assessment service 180 may include the respective memory of each computing device of the plurality of computing devices.

Figure 4:
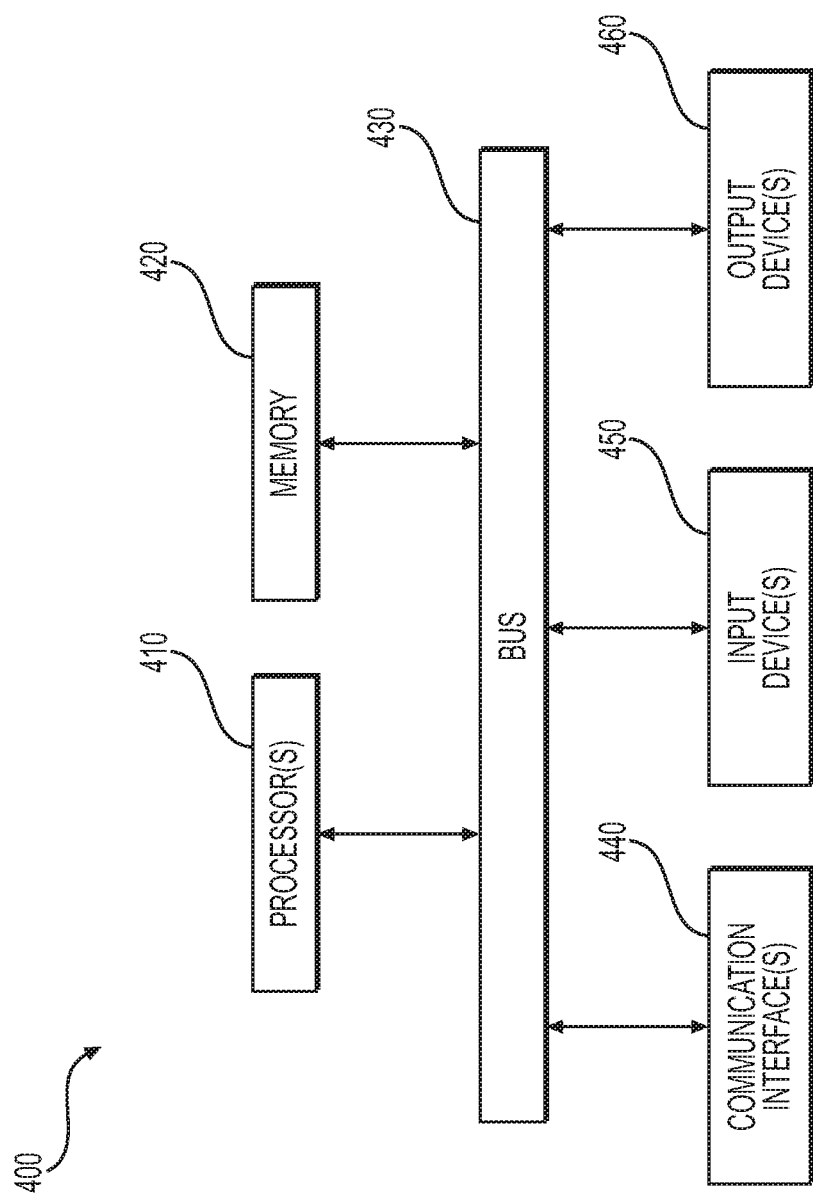
FIG. 4 depicts an example of a computing device, according to one or more embodiments.

FIG. 4 illustrates an example of a computing device 400 of a computer system, such as the user device 112, merchant/P2P systems 130, verification system 150, and/or risk assessment service 180. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as an embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. An authentication method, comprising:
receiving a request to perform an interaction from a first device of a user;
assigning a risk status to the request;
transmitting a notification communication to the first device to prompt an authentication interaction between a second device of the user and a remote authentication system;
monitoring interaction data from an interaction network for authentication interaction information generated from the prompted authentication interaction;
identifying, from the monitored interaction data, the authentication interaction information, the authentication interaction information including a coded sequence and a predetermined authentication identifier, the coded sequence generated by the remote authentication system based at least in part on the second device;
comparing the coded sequence in the authentication interaction information to an expected coded sequence; and
transmitting a verification communication after determining the coded sequence in the authentication interaction information matches the expected coded sequence, the match indicating the second device is authentic.

2. The authentication method of claim 1, wherein the notification communication is configured to cause the first device to display a notification requesting a supplemental authentication to prompt the authentication interaction.

3. The authentication method of claim 1, wherein the coded sequence of the authentication interaction information is generated by a cryptographic-enabled reader of the remote authentication system.

4. The authentication method of claim 1, further comprising:
in response to assigning the risk status to the request, denying or placing a hold on the request; and
after comparing the coded sequence to the expected coded sequence, transmitting an authorization communication to the first device.

5. The authentication method of claim 1, wherein the second device is a cryptographic-enabled device, and the coded sequence is generated by a cryptographic-enabled reader of the remote authentication system.

6. The authentication method of claim 1, wherein the monitored interaction data is obtained via an interaction rail platform.

7. The authentication method of claim 1, further comprising updating a user classification database, the user classification database storing user identifiers and trust level information associated with the user identifiers, by increasing a level of trust.

8. The authentication method of claim 1, further comprising receiving, from the first device, at least one of biometric information or geographic location information.

9. The authentication method of claim 1, further comprising:
receiving, from the first device, geographic location information; and
comparing the geographic location information to geographic information associated with a stored geographic location associated with the remote authentication system.

10. An authentication system, comprising:
a communication device;
a memory storing instructions; and
one or more processors configured to execute the instructions to perform operations including:
identifying a user request that has an assigned risk status requiring authorization;
transmitting a notification to a user device of a user associated with the user request, the notification including a request for authentication with a cryptographic-enabled device associated with the user;
receiving a coded sequence which was generated at least in part by the cryptographic-enabled device;
comparing the received coded sequence and an expected coded sequence;
updating a data security database storing user identifiers and authentication level information associated with the user identifiers to increase an authentication level associated with the user based on the comparison of the received coded sequence and the expected coded sequence; and
authorizing a subsequent user request that has an assigned risk status requiring authorization based on the increased authentication level associated with the user.

11. The authentication system of claim 10, wherein the operations further comprise transmitting a list of locations containing a cryptographic-enabled reader.

12. The authentication system of claim 10, wherein the user request includes a peer-to-peer interaction request.

13. The authentication system of claim 10, wherein the operations further comprise:

in response to identifying the user request requiring authorization, denying or placing a hold on the request; and after comparing the received coded sequence to the expected coded sequence, transmitting a communication to approve the request.

14. The authentication system of claim 13, wherein the received coded sequence is obtained via an interaction rail platform.

15. The authentication system of claim 14, wherein the received coded sequence is generated based on a signal generated by a secure processor included in the cryptographic-enabled device.

16. The authentication system of claim 10, wherein the operations further comprise receiving, from the user device associated with the request, geographic location information of the user device associated with the request.

17. The authentication system of claim 16, wherein the operations further comprise comparing the geographic location information to expected geographic information associated with a cryptographic-enabled reader.

18. An authentication method, comprising:

receiving a request to perform an interaction from a first device of a user;

assigning a risk status to the request by evaluating the request or by receiving a risk assessment from one or more external services;

transmitting a notification element to the first device, the notification element being indicative of a decline of the request or a hold on the request, and prompting an authentication interaction between a cryptographic-enabled, second device of the user and a remote authentication system;

identifying authentication interaction information generated from the authentication interaction, the authentication interaction information including a cryptographic key and a predetermined authentication identifier, the cryptographic key generated by a cryptographic-enabled reader of the remote authentication system based at least in part on the second device;

comparing the cryptographic key in the authentication interaction information to an expected cryptographic key; and transmitting a verification communication to the first device when the cryptographic key in the authentication interaction information matches the expected cryptographic key.

19. The authentication method of claim 18, wherein when the request is declined, the verification communication prompts resubmission of the request for approval.

20. The authentication method of claim 18, wherein when the request is on hold, the verification communication indicates the request is approved.

* * * * *